United States Patent
Throop

(10) Patent No.: US 9,625,967 B1
(45) Date of Patent: Apr. 18, 2017

(54) MANAGING POWER REDUCTION IN DATA CENTER COMPONENTS

(71) Applicant: Dean D. Throop, Efland, NC (US)

(72) Inventor: Dean D. Throop, Efland, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 970 days.

(21) Appl. No.: 13/626,182

(22) Filed: Sep. 25, 2012

(51) Int. Cl.
   *G06F 1/26* (2006.01)
   *G06F 1/32* (2006.01)

(52) U.S. Cl.
   CPC .................................. *G06F 1/3203* (2013.01)

(58) Field of Classification Search
   CPC ........................................................ G06F 1/3203
   See application file for complete search history.

(56) References Cited

U.S. PATENT DOCUMENTS

| | | | | |
|---|---|---|---|---|
| 2002/0178387 | A1* | 11/2002 | Theron | 713/300 |
| 2004/0015571 | A1* | 1/2004 | Miyazaki | H04L 12/2602 709/220 |
| 2007/0211689 | A1* | 9/2007 | Campero | G01S 13/74 370/351 |
| 2009/0187633 | A1* | 7/2009 | Koponen | H04L 67/28 709/206 |
| 2010/0064151 | A1* | 3/2010 | Saeki | 713/300 |
| 2011/0138206 | A1* | 6/2011 | Garcia-Tobin | G06F 1/3203 713/322 |
| 2013/0318371 | A1* | 11/2013 | Hormuth | 713/320 |

* cited by examiner

*Primary Examiner* — Kim Huynh
*Assistant Examiner* — Eric Chang
(74) *Attorney, Agent, or Firm* — Krishnendu Gupta; John T. Hurley

(57) ABSTRACT

A method is used in managing power usage in data center components. A control center is provided to manage power state information for multiple data center components. The control center may register data center components capable of operating in a reduced power state. The control center acquires requests to change the power state information and generated data center component instructions indicative of the power state information. The instructions are communicated to the registered data center components. The instructions are receive at the registered data center components and power usage is adjusted based on the received instructions.

20 Claims, 6 Drawing Sheets

MANAGING POWER REDUCTION IN DATA CENTER COMPONENTS

BACKGROUND

Technical Field

This application relates to managing power usage in data center components.

Description of Related Art

Data centers provide computational and storage resources for executing applications and storing data. IT organizations and service providers may have multiple data centers that they use to conduct their business. The organizations run variety of business critical applications and services such as, internet access, email, database, numerous applications programs and the like, using servers and storage systems at the data centers.

Data centers that are provisioned with a large number of hardware resources in order to meet maximum required demand levels thus consume high levels of power. The cost of purchasing power is becoming an increasingly significant burden in the operation of modern data centers. Although data centers are built to perform at optimal performance levels, during periods of low processing demand from enterprise applications, idle data center servers, storage arrays, individual processors, and/or cores within single servers often continue to consume power.

As a result, the cost of electricity is becoming a significant portion of the total cost of operation in many data centers. Further, the power consumption rate permitted is sometimes limited by contracts with power suppliers. Such data centers are not permitted under their contracts to use an amount of power over a specified limit, and raising the limit, will result in a higher monthly fee for the data center. Thus, data center operators need to monitor the tradeoff between application availability and power consumption costs.

As with data centers, industrial and consumer demand for electricity has continued to increase as well. This additional demand may, and often does, outstrip the grid's power capacity resulting in brownouts and/or rolling or full blackouts. In an effort to address such situations utilities may enter into Power Purchase Agreements with large users of electricity where a discount may be offered if the user agrees to lowering usage during peak demand periods upon notification from the utility. Also during exceptional conditions such as lost of generating capacity due to power generating or transmissions failure resulting in brown out conditions where data centers must either run with reduced power or shutdown

SUMMARY OF THE INVENTION

A method is used in managing power usage in data center components. A control center is provided to manage power state information for multiple data center components. The control center may register data center components capable of operating in a reduced power state. The control center acquires requests to change the power state information and generated data center component instructions indicative of the power state information. The instructions are communicated to the registered data center components. The instructions are receive at the registered data center components and power usage is adjusted based on the received instructions.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
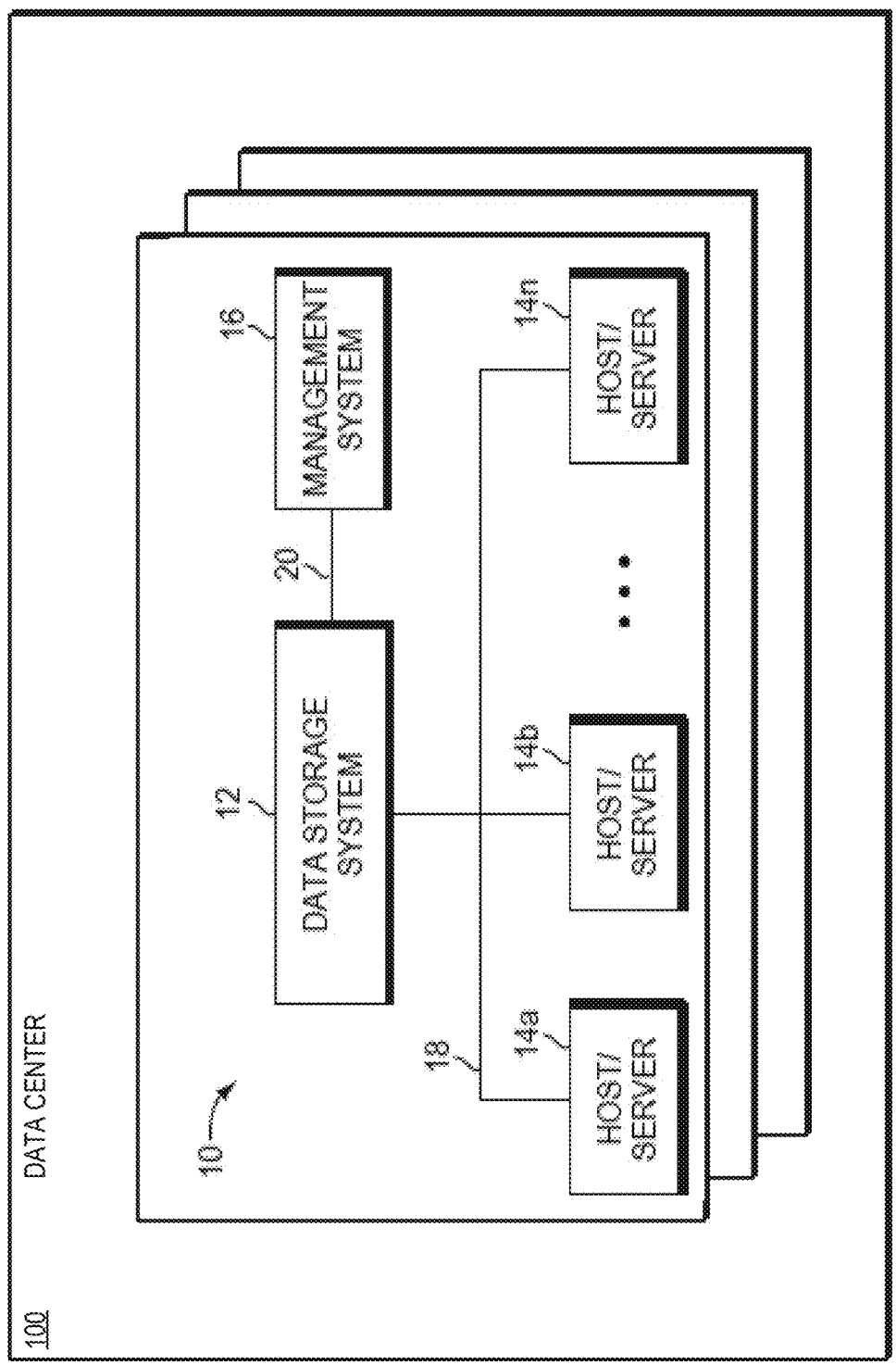
FIG. 1 is an example embodiment of a data center that may utilize the techniques described herein.

In general terms, the present invention relates to power usage and exceptional condition management for data center components such as data storage systems, servers, and related equipment in data centers. When the power grid's capacity reaches or exceeds customer demand, brownouts and/or rolling blackouts may occur. Brownouts may also occur as a result of equipment failures that reduce utility provider's ability to provide normal operating power. In such situations, power companies may issue alerts where customers must reduce their power usage to avoid a total blackout.

Power utilities have attempted to deal with the situation in a number of ways. For example, in exchange for lower rates, companies may contract with the power utilities to agree to reduce power usage when requested to do so by the power utilities when the load placed on the power grid approaches the grid's capacity due to, for example, equipment failure or peak usage periods during a heat wave. Such contracts are typically offered to users that consume a large amount of power during normal operation. Such contracts allow the power utilities to identify a small number of users consuming a higher percentage of power enabling larger and quicker usage reduction rather than trying to target a large number users consuming much lower amounts of power (e.g., individual households).

Conventionally, within a data center, a system administrator may manually adjust equipment to reduce power usage. Typically, this is done on an ad hoc basis and may require specific device knowledge for each component that is adjusted. For example, a system administrator may log in to one or more data storage arrays capable of power adjustments and attempt to place the array in a reduced power state. Similarly, application servers capable of operating in a reduced power state may also be manually adjusted to reduce power consumption on a one by one basis until power consumption has been sufficiently reduced. Likewise, various other systems, such as power supplies, cooling systems, fans, and the like may also be capable of operating in a reduced power usage mode. In these cases, the system administrator again has to manually reduce each device's parameters to reduce power usage. When power usage levels are readjusted, for example, when the condition that required the initial power usage reduction clears, system administrator must again manually repeat the process.

By contrast, implementing techniques described herein, a system administrator may be able to control and adjust, from a central control station, multiple components within a data center. In an example embodiment, a power usage setting, such as a single "knob" displayed in the central control station may be adjusted to increase or decrease power consumed by multiple data storage systems and servers thereby providing a way for system administrators to easily, quickly, and in a coordinated manner decrease total power consumed by the data center. Advantageously, implementation of such techniques may allow data center operators to qualify for power company discounts, and/or satisfied potential government mandates for effective power management as well as reducing overall power costs.

An example implementation may include sending a notification to each of the data center's storage arrays wherein each data storage array may then initiate power reduction methods available in such systems. These actions may reduce the performance of the data storage systems; however, such power reduction techniques may prevent a complete or rolling blackouts thereby allowing the data center to continue operating in a brownout condition.

Consequently, data center operators employing techniques described herein may be able to qualify for lower utility rates by demonstrating the ability to reduce power when requested to do so by the power utility. Furthermore, such techniques may allow data center operators to decrease power usage during, for example, peak hours where the cost of electricity may be higher than off peak hours. In addition, or alternatively, techniques described herein may be used to reduce overall electricity consumption thereby reducing total cost of operation.

Although the current techniques describe modifying power usage by reducing power consumed by the data center components, these techniques should not be construed as limited as such. One implication with respect to reducing power usage at the request of a power utility is that after demand decreases, or equipment is repaired, the data center components can be returned to normal power operating mode to, for example, allow the data center to return a target service level such as those prior to the power reductions. Thus, current techniques may be similarly employed to increase power usage based on appropriate power state information.

It should be noted that techniques described herein should not be construed as being limited to data storage systems and servers. As used herein, data center components refer to any component or system capable of operating in a reduced power mode. Thus, alternative example embodiments may include a central control station configured to reduce data center power usage by adjusting operating characteristics (e.g., spin rate, voltage, current, clock speed, core settings, etc.) for multiple different types of equipment including, but not limited to, data storage systems, servers, computer systems, climate control systems, power supplies, fans, and any other such systems capable of reducing power upon receipt of an instruction or similar notification.

Referring now to FIG. 1, shown is an example of an embodiment of a data center 100 including multiple computer systems 10 that may be used in connection with performing the technique or techniques described herein. Each computer system 10 may include one or more data storage systems 12 connected to one or more host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage system 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host/server computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host/server computers 14a-14n, the management system 16 and data storage systems may all be located at the same physical site, or, alternatively, may also be located in different physical locations (i.e., different data centers and/or different geographical locations separate from each other). In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host/server computer systems may perform different types of data operations in accordance with different types of tasks. In the embodiment of FIG. 1, any one of the host/server computers 14a-14n may issue a data request to the data storage systems 12 to perform a data operation. For example, an application executing on one of the host/server computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. Furthermore, some parts of the data storage system may be dedicated to archival storage or other long term infrequently read/accessed storage that is particularly suited for reducing power in normal as well as exceptional conditions. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host/server computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2:
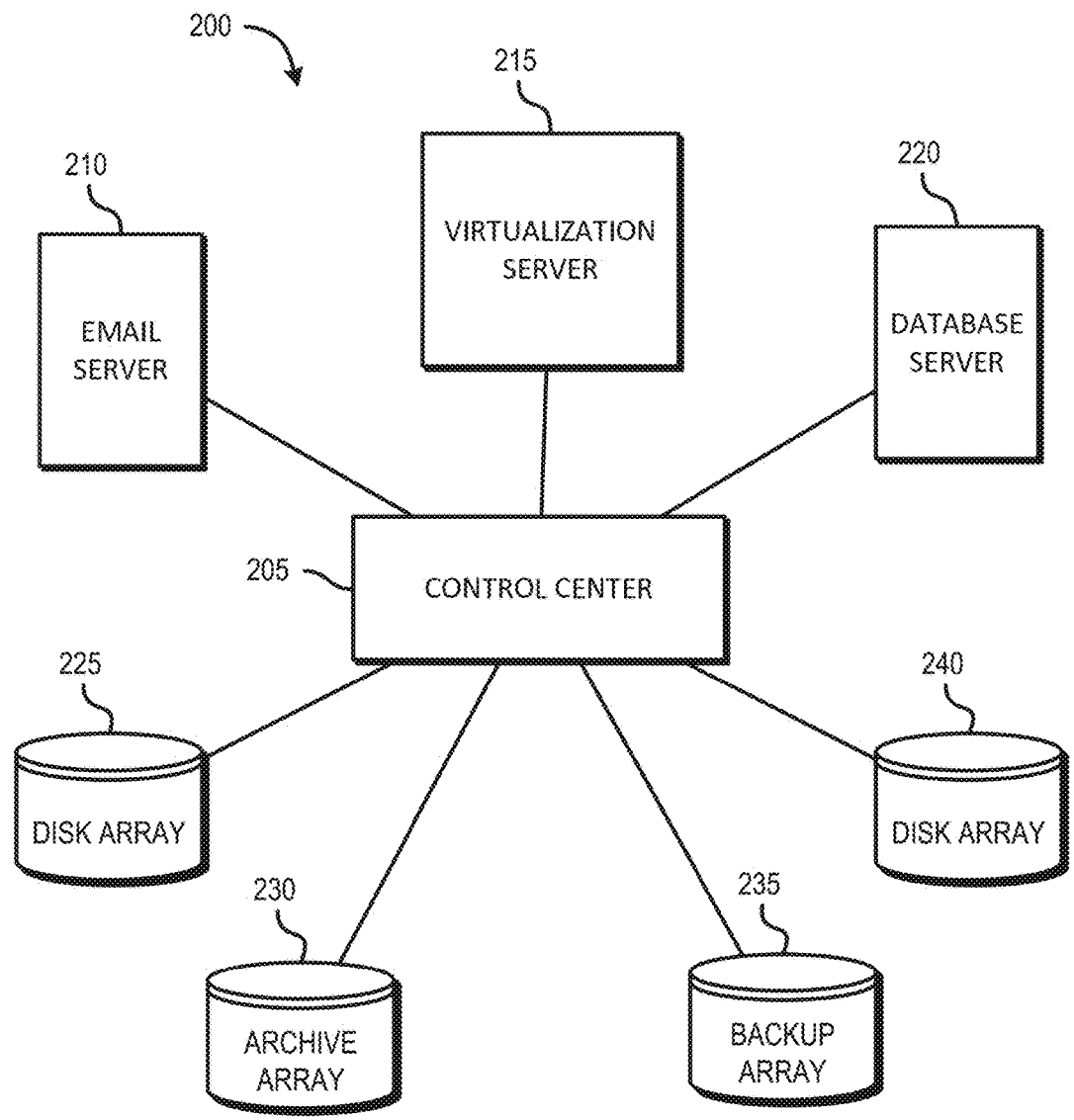
FIG. 2 is a block diagram illustrating an example embodiment depicting data center components that may utilize the techniques described herein.

Referring now to FIG. 2, shown is an example 200 of components that may be used in connection with the current techniques described herein. The example 200 may represent components illustrated in connection with FIG. 1 as configured in a data center as a computer system (also referred to herein as an access node). Included in the example 200 is a control center 205 in communication with various data center components, including disk array 225, 240, archive array 230, and backup array 235 along with various application servers, 210-220. Although depicted as a single computer system or access node, the control center may be in communication with multiple computer system storage arrays and servers in the data center. In various embodiments, depending on the data center's configuration and size, the control center 205 may be in communication with hundreds or thousands storage arrays and servers.

The control center 205 may be in communication with one or more virtualization servers. Virtualization as used herein refers to any one of an individual computer system with virtual machine management functionality, a virtual machine host, an aggregation of an individual computer system with virtual machine management functionality and one or more virtual machine hosts communicatively coupled with the individual computer system, etc. Examples of virtualization systems include commercial implementations, such as, for example and without limitation, VMware® ESX Server™, available from VMware, Inc., Palo Alto, Calif.; operating systems with virtualization support, such as Microsoft® Virtual Server 2005; and open-source implementations such as, for example and without limitation, available from XenSource, Inc.

As shown, the control center 205 may also be in communication with other various types of servers configured for a particular purpose. Example servers may include one or more email servers 210, such as a Microsoft® Exchange email server, available from Microsoft, Corp., Redmond, Wash., or similar email server; and one or more database servers 220 that such as relational database servers, such as an Oracle database server, available from Oracle, Corp., Redwood Shores, Calif. Other server types (e.g., web servers, etc.) as are known in the art may be similarly implemented.

The control center 205 may also be in communication with multiple data storage arrays 225-240. For example, disk arrays 225 and 240, individually or in combination, may be configured to support one or more servers, such as the email server 210, virtualization server 215, and/or the database server 220. Data storage arrays 225 and 240 may also be configured, partially or completely, to support a specific application or purposes such as the archive array 230 for storing archived data or backup array 235 for storing backup data. Such arrays may employ various storage technology media such as, for example, and without limitation, hard disk drives, solid state memory such as Flash drives, tape storage, optical, and other various media types as understood by those skilled in the art.

The control center 205 may also be in communication with other data center components (not shown) that are capable of operating in a reduced power mode such as power supplies, environmental control systems (e.g., cooling, heating, and ventilation), fans, lighting, and the like.

Figure 3:
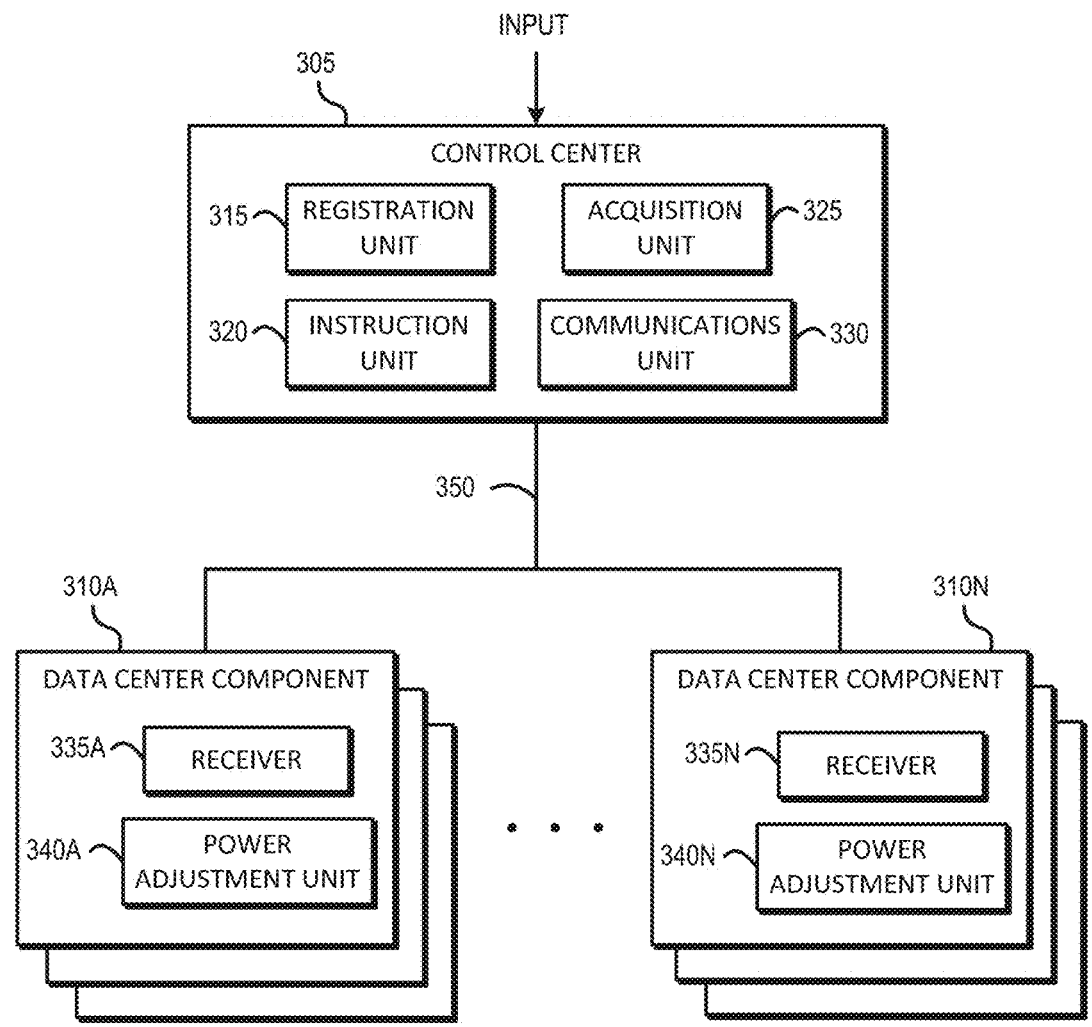
FIG. 3 is a block diagram illustrating an example embodiment in further detail depicting data center components that may utilize the techniques described herein.

Referring to FIG. 3, shown is a more detailed representation of components that may be included in an embodiment using the techniques described herein. In the example, shown is a control center 305 connected one or more data center components 310A-310N through communication medium 350. The control center 305 and the data center components 310A-310N may operate in a manner similar to that as described above and further explained below.

The communication medium 350 may be any one or more of a variety of networks or other type of communication connections as known to those skilled in the art. The communication medium 350 may be a network connection, bus, and/or other type of data link, such as a hardwire, wireless, or other connections known in the art. For example, the communication medium 350 may be the Internet, an intranet, network (including a Storage Area Network (SAN)) or other wireless or other hardwired connection(s) by which the control center 305 may access and communicate with the data center components 310A-310N, and may also communicate with other components as described herein.

The control center 305 may include a registration unit 315, instruction unit 320, acquisition unit 325, and communications unit 330. The registration unit 315 may be configured to register the various data center components 310A-310N that are capable of operating in mode that effectively reduces power consumption. Such registration procedures may include component discovery initiated by the control center 305 and/or broadcast procedures executed by the data center components 310A-310N. Alternatively, or in addition, a user may provide the registration information by, for example, entering such information into a graphical user interface (GUI), a command window, execution of a process or script, or other such input procedures. The registration information may be stored in a table, database, or the like.

The acquisition unit 325 may be employed to acquire information from a user or process for use in initiating a power state for the one or more data center components 310A-310N such that the power usage of the data center components 310A-310N changes. For example, a power state or profile may be acquired that causes the data center components 310A-310N to be placed in a reduce power usage condition. At some time later, the user or a process may communicate a new power state so as to cause the data center components 310A-310N to return to standard operating power usage conditions. The acquisition unit 325 may acquire power state information from a user, process, stored state, or other such source. Power state information may be based on quantitative values such as, for example, a percentage or number of watts. Alternatively, power state information may be more abstract, such as a service level or setting related such as normal, general reduction, extreme reduction, sleep mode, or complete power-down.

Alternatively, or in addition, power state information may be received from the data center components 310A-310N where, one or more data center components 310A-310N may request that their power usage be modified. For example, a data center component may request full/normal power usage until a critical process or operation is complete. Such request may have different levels or priority such that urgent request may be satisfied sooner that less urgent request, depending on overall power state goals. The request may include information indicating how long or certain conditions for which it needs to remain in a full power state. Alternatively, or in addition, the control center may periodically poll the component to determine when the component is ready to enter a reduced power state.

The instruction unit 320 may obtain the acquired power state information for use in generating one or more instructions sufficient to change the data center components' 310A-310N power usage based on the acquired information. Such instructions may be data center component specific. For example, instructions may include instructing a data storage system to reduce one or more hard disk drive's spin rate or instructing a server to reduce power to one or more cores of a multi-core CPU, clock rate, or the like. Instructions may also include generic instructions that are independent of a type of data center component (e.g., reduce fan speed, etc.). Alternatively, the acquired power state information may be passed directly, or with some modification, to the communications unit 330 where such instructions may be forwarded to data center components 310A-310N capable of processing the power state information directly (i.e., without being converted to data center component specific instructions, for example). In either case, the instructions or power state information taking the form of electrical signals that can be communicated by the communications unit 330 to the one or more data center components 310A-310N via any number of communications techniques as is known in the art including, but not limited to, wired, wirelessly, or a combination thereof.

Each data center component 310A-310N may include a receiver 335A-335N and a power adjustment unit 340A-340N. The receivers 335A-335N may be configured to receive power state information from the control center's 305 communications unit 330. The signals may be further conditioned, formatted, and/or processed for subsequent use by the data center components 310A-310N. Alternatively, the power state information may be forwarded directly to the data center components 310A-310N, or with some modification as necessary.

The power adjustment units 340A-340N may be configured initiate an action to reduce its respective data center component's power usage as appropriate to the particular component. For example, such actions may include instructing a data storage system to reduce spin rates for one or more hard disk drives, migrating data from hard disk drives to solid state drives, instructing a server to reduce power to one or more cores of a multi-core CPU, and the like.

By way of example, power usage reduction as applied to data storage systems employing technique described herein is presented in further detail below. However, such techniques are equally applicable to any data center component that is capable of operating in different power usage modes. In this way, the central control center may be configured to coordinate and initiate power usage variations for any or all data center components in a quick, coordinated and convenient manner from central location/interface. The adjustment may be performed by adjusting knob or other mechanism in a control center GUI in order to reduce or increase power usage for any one, group, or substantially all data center components. Other GUI techniques for entering a quantity, level, or mode may be similarly used.

Storage arrays and servers consume a significant portion of the energy in a data center. For example, within storage arrays, disk drives, especially the motors that spin the physical disks consume a large portion of the storage array's power budget. In data storage systems, I/O requests for data may be not evenly distributed and some data may be frequently accessed (hereinafter, "hot" data) and some data may be infrequently accessed (hereinafter, "cold" data).

Modern disk drives typically have several power modes: active, idle, standby, and sleep, each respectively utilizing less power, that allow disks to be spun down during idle time to save energy. In the active mode, a disk is actively seeking, writing or reading with the platters are spinning at full speed. In the idle mode, the platters remain spinning but the read/write electronics are off and the disk head may be parked. In the standby mode, the platters are not rotating. The sleep mode shuts off power to all remaining electronics.

Switching between levels requires some energy as well as time depending on the transition. The switch between active and idle is almost instantaneous with little change in energy consumption; accordingly, the disk can quickly switch between the idle and active modes. Therefore, the active and idle modes may be used interchangeably throughout with respect to energy consumption (i.e., maximum or hot). In addition, it may be appreciated that many conventional power management policies implemented by the disk controller assume only two power states: a working state (e.g., the active/idle state) and a low power state (e.g., the standby state or the sleep state). Accordingly, for simplicity of discussion, the same assumption is used below. However, this is not intended to be limiting and power management policies having more than two power states may be implemented without departing from the scope of the subject matter described herein.

The standby mode consumes less power over time; however, to serve a request, a disk must return to the active mode which requires both time and energy. The transition from active mode to standby mode is referred to as "spin down" and the transition from standby mode to active mode as "spin up." A disk must remain in standby mode for a period of time, the "break-even" time, to compensate for the additional energy expense to transition between states. The break-even time for a disk drive depends on its operational parameters. As previously mentioned, the disk requires extra energy and time to spin down and then spin up. For a particular disk, there is a time period during which it costs the same amount of energy to keep the disk in the idle mode or to spin the disk down, stay in the standby mode and then spin it up (i.e., the break-even time). Furthermore, disk activities can be viewed as a sequence of disk accesses, each of which is represented by its access time. The time period between two successive accesses may be hereinafter referred to as an idle interval.

A data storage array can reduce its overall total power consumption by relocating data based on activity levels in order to optimize the ability to spin down disks on one more drives. The storage array may access the data by, for example, mapping addresses. The storage array can record when an element of data (e.g., a slice of data) was last accessed and use the time last accessed as a guide for where to relocate the data. The storage array may group all the data elements with the longest time last accessed together on one set of disks separate from all the data elements with the shortest time last accessed. This may allow the disks with data that hasn't been accessed recently to be spun down so the storage array uses less power. On data storage arrays with lots of disks, the data elements can be sorted into multiple groupings based on time last accessed so if one group if disks does need to be spun up, other disks can remain spun down.

Additional details regarding drive spin down are disclosed in U.S. patent application Ser. No. 13/248,573, filed on Sep. 29, 2011, entitled "RELOCATING MAPPED DATA TO FACILITATE DRIVE SPIN DOWN IN DATA STORAGE SYSTEMS" and U.S. patent application Ser. No. 13/338,428, filed on Dec. 28, 2011, entitled "MANAGING DATA STORAGE BACKUP TO FACILITATE DRIVE SPIN DOWN IN DATA STORAGE SYSTEMS" which are incorporated by reference herein in their entireties.

Thus, example embodiments may employ techniques described herein to provide a system to manage power reduction in data center components that includes a control center configured to manage power state information for multiple data center components. The control center may include a registration unit configured to register, via the control center, data center components capable of operating in a reduced power state, an acquisition unit configured to acquire, at the control center, a request to change the power state information, an instruction unit configured to generate data center component instructions indicative of the power state information, and a communication unit configured to communicate the instructions to the registered data center components. The control center may be communicatively coupled to data center components that may include a receiver configured to receive the instructions at the registered data center components and a power adjustment unit configured to adjust power usage at the registered data center components based on the received instructions.

Figure 4:
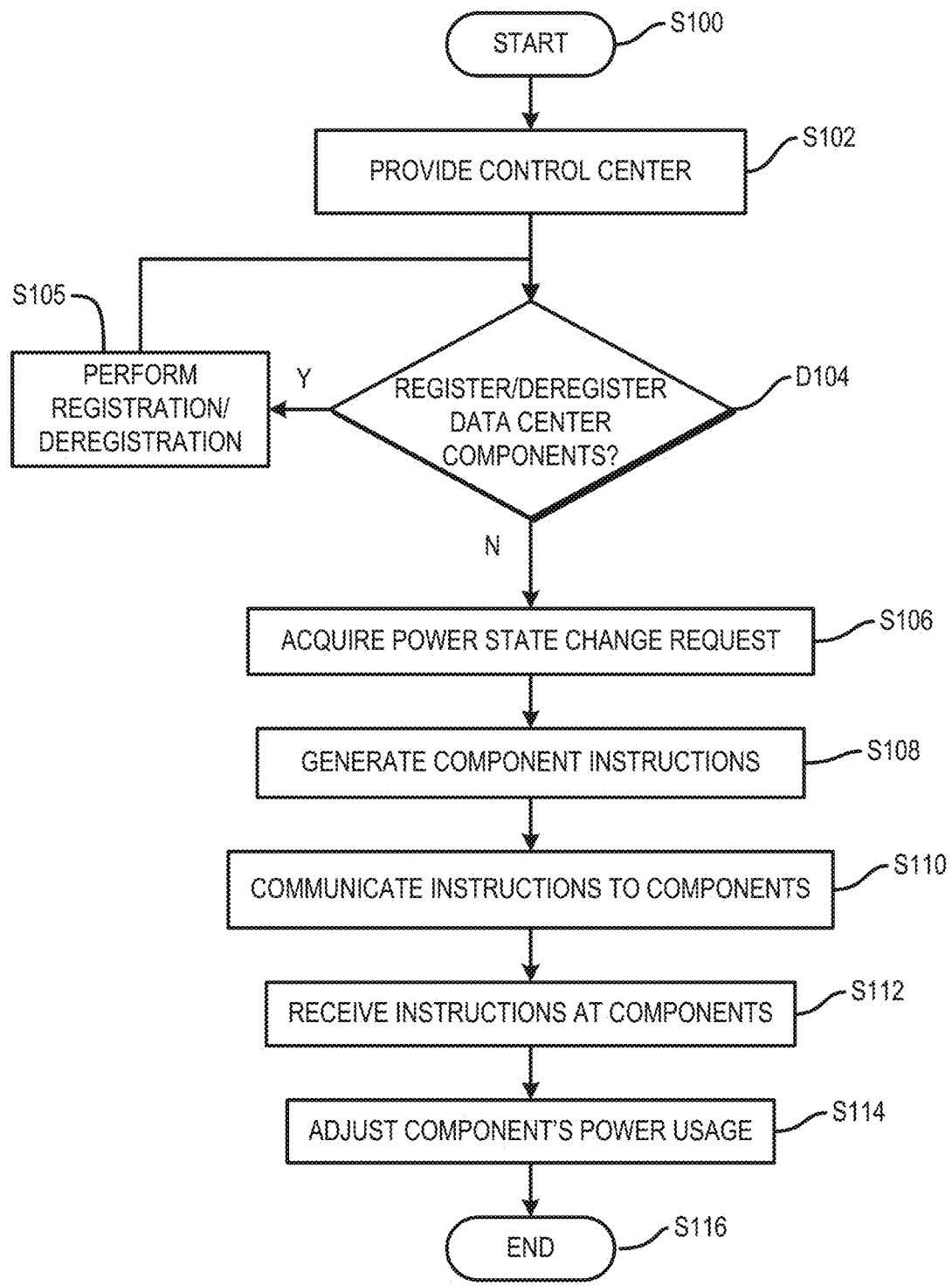
FIG. 4 is a flow diagram illustrating a process that may be used in connection with techniques described herein.

FIG. 4 is a flow diagram that illustrates an example method for managing power usage in data center components similar to that shown in FIGS. 2 and 3. While various methods disclosed herein are shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the method can start with a step S100. The method can be initiated manually by a user, for example, by entering a command in a command-line-interface or by clicking on a button or other object in a graphical user interface (GUI). The method can also be initiated automatically by management software and/or can be scheduled to run automatically at certain dates and times. In one embodiment, the method can be configured to execute for a predetermined number minutes, hours, etc. and/or during some off-peak period in which the data center is typically at a low activity level. Execution of the method can also be based on various user or system specified constraints as described herein.

The method further includes a step S102 to provide a control center to manage power state information for multiple data center components. The power state information may include a time indicating when power usage was last adjusted. In step D104, a determination is made to determine whether to register or deregister a data center component capable of operating in a different (e.g., reduced) power modes or states. If so, the method proceeds to step S105 and the component(s) may be appropriately registered or deregistered and the method proceeds back to step D104. Data center components may be registered when the components are installed in, or deregistered when the components are removed from, the data center. Alternatively, or in addition, data center components may be registered or deregistered by a user or process using, for example, the data center component's address information, configuration information, and the like. Previously registered data center components may also be de-registered including, but not limited to, in response to receiving a message generated by the data center component itself, a command initiated by a user or system software, and/or if the component does not generate an acknowledgment after a determinable time period.

In step 106, the control station acquires a power state change request. For example, a user may want to dial back power usage such that power is reduced by a certain percentage or a number of watts. The user may provide information indicative of the desired power state change by adjusting a knob, slider, data entry field, or other object in a graphical user interface (GUI) or by entering a command in a command-line-interface. Alternatively, or in addition, such information may be provided by software or other automated or semi-automated process. In step S108, the method may generate component instructions sufficient to effect the necessary power reduction (or power increase as the case may be). The instructions may be generated based on component registration information, configuration information, stored state/instruction information or the like. Alternatively, power state information may be passed through essentially unchanged in cases where particular data center components can process power state information directly.

Next, in step S110, the method may communicate instructions to various data center components. Instructions may be re-communicated if the control center does not receive an acknowledgment from one or more data center components, after, for example, a particular time period. Such re-communication techniques may allow recovery from transient communications problems, provide the ability to handle temporarily intermittent or down communication links, and temporary data center component unavailability (e.g., component reboot, command ignore, process override, etc.). Alternatively, or in addition, the method may periodically scan the registered data center components and may re-communicate instructions to one or more components having an acknowledge time generated before the most recent power usage adjustment. In step S112, the registered data components receive the instructions. An acknowledgment responsive to receipt of the instructions may be generated and communicated back to the control center. At step S114, power usage at the respective registered data center components may be adjusted based on the received instructions. Such instructions may result in power usage being increased or decreased, as the case may be. For example, in the case of the data storage system, the spin rate may be reduced partially or completely by placing the drive in an appropriate power saving mode such as shutdown. In the case of a multiprocessor server, power to one or more processors may be decreased where, in addition to power usage decreasing due the processors themselves, other associated components (e.g., fans, cooling systems, etc.) may reduce, or be caused to reduce, power usage as well.

It should be noted that execution of the method may be dependent on receiving permission from a system administrator or process. The administrator may have the ability to start, monitor, and stop the method at their discretion. This may be useful in the case where a particular service level is required, and thus, any performance reduction potentially outweighs the cost savings resulting from a requested power usage reduction. In this case, the system administrator may halt the method and change power usage parameters as necessary to achieve the desired service level. Alternatively, or in addition, the method may be automatically started, monitored, and stopped by the control center or other high-level process in conjunction with the control center.

The subject matter described herein for managing power usage in data center components may be implemented in hardware, software, firmware, or any combination thereof. As such, the terms "system," "technique," or "logic" as used herein may refer to hardware, software, firmware, or any combination thereof for implementing the feature being described.

The methods and system of this invention may take the form, at least partially, of program code (i.e., instructions) embodied in tangible non-transitory media, such as CD-ROMs, hard drives, random access or read only-memory, or any other machine-readable storage medium. In addition, a computer program product that implements the subject matter described herein may be located on a single device or computing platform or may be distributed across multiple devices or computing platforms.

Figure 5:
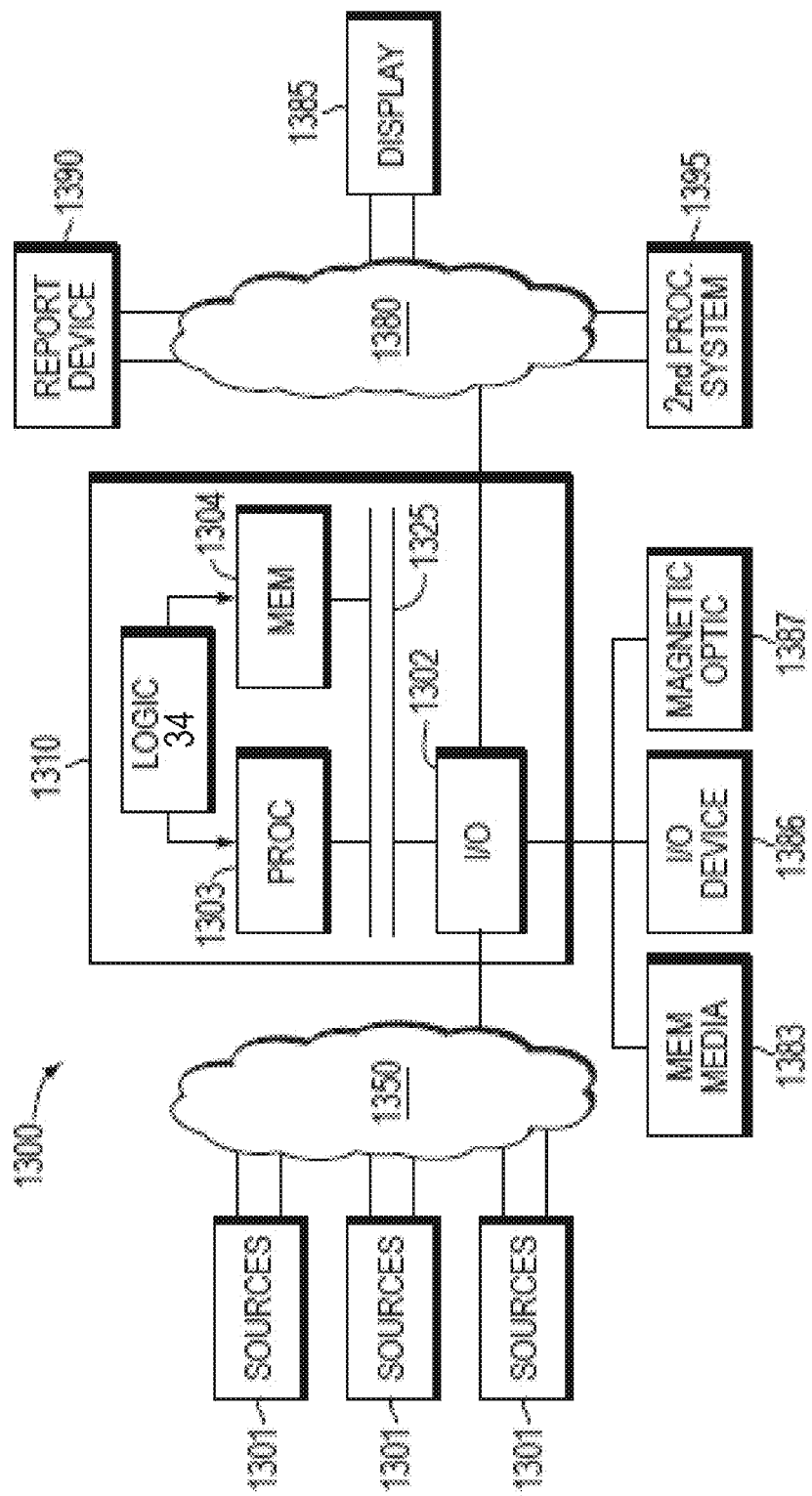
FIG. 5 is an example embodiment of a system that may carry out method steps described herein, in accordance with an embodiment of the present disclosure.
Figure 6:
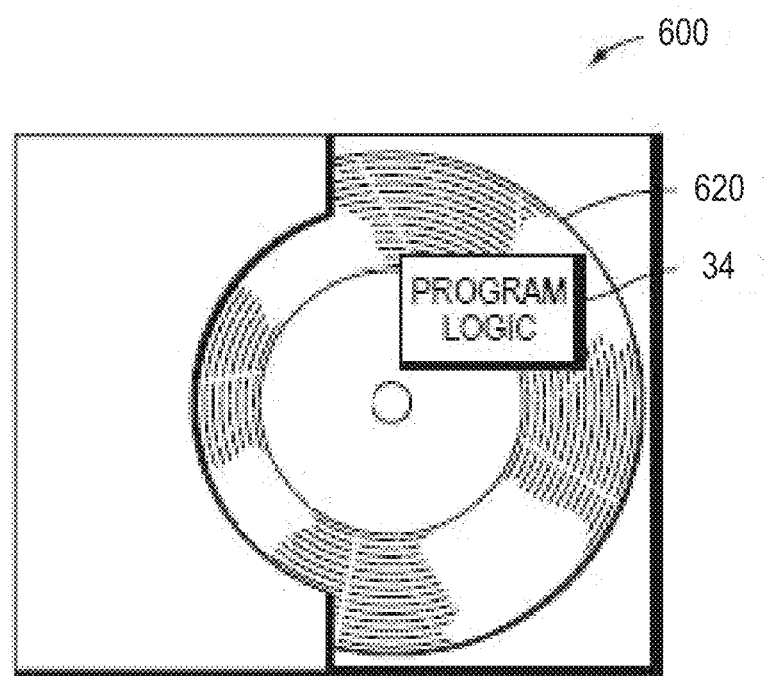
FIG. 6 is an example of a non-transitory computer readable medium having stored thereon computer executable instructions in the form of program logic, that when executed by the processor of a computer perform method steps as described herein.

When the program code is loaded into and executed by a machine, such as the computer of FIG. 5, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine. FIG. 6 shows Program Logic 34 embodied on a computer-readable medium 620 as shown, and wherein the Logic is encoded in computer-executable code configured for carrying out the techniques describe herein and thereby forming a Computer Program Product 600. Logic 34 of FIG. 5 may be loaded into memory 1304 and executed by processor 1303. Logic 34 may also be the same logic 34 on computer readable medium 620.

The logic for carrying out the method may be embodied as part of the aforementioned system, which is useful for carrying out a method described with reference to embodiments shown in, for example, FIGS. 2-4. For purposes of illustrating the present invention, the invention is described as embodied in a specific configuration and using special logical arrangements, but one skilled in the art may appreciate that the device is not limited to the specific configuration but rather only by the claims included with this specification.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing power usage in data center components, the method comprising:
   providing a control center to manage power state information for multiple data center components, wherein the power state information includes a metric indicating when power state information was last adjusted;
   initiating, via the control center, component discovery, wherein component discovery includes identifying data center components capable of operating in a reduced power state;
   registering, via the control center, data center components identified as capable of operating in a reduced power state;
   acquiring, at the control center, a request to change a device operating condition for one or more data center components, wherein the request includes, for each of the one or more data center components, information associated with the power consumption of the data center component and a device registration status, the status including register or deregister;
   generating data center component instructions indicative of the power state information and registration status;
   communicating the instructions to the registered data center components;
   receiving the instructions at the registered data center components; and
   deregistering the data center component if the instruction includes a deregister status, else adjusting power usage at the registered data center components based on the received instructions.

2. The method of claim 1, wherein receiving the instructions at the registered data center components further includes generating an acknowledgement responsive to receiving the instructions and communicating the acknowledgement back to the control center.

3. The method of claim 2, wherein communicating the instructions to the registered data center components further includes re-communicating the instructions if an acknowledgment is not received at the control center.

4. The method of claim 2, further comprising periodically scanning the registered devices and resending the instructions to one or more data center components having an acknowledge time generated before the most recent power usage adjustment.

5. The method of claim 1, wherein one or more data center components are remotely located from one or more other data center components.

6. The method of claim 1, wherein registering data center component includes allowing a user to manually enter the data center component's address information.

7. The method of claim 1, further comprising deregistering a registered data center component responsive to receiving a message generated by the data center component.

8. The method of claim 1, further comprising deregistering a registered data center component responsive to a command initiated by a user.

9. The method of claim 1, further comprising deregistering a registered data center component if the component does not generate an acknowledgment.

10. A system for use in managing power usage in data center components, the method comprising:
    a control center configured to manage power state information for multiple data center components, wherein the power state information includes a metric indicating when power state information was last adjusted;
    a registration unit configured to initiate, via the control center, component discovery, wherein component discovery includes identifying data center components capable of operating in a reduced power state;
    the registration unit further configured to register, via the control center, data center components identified as capable of operating in a reduced power state;
    an acquisition unit configured to acquire, at the control center, a request to change a device operating condition for one or more data center components, wherein the request includes, for each of the one or more data center components, information associated with the power consumption of the data center component and a device registration status, the status including register or deregister;
    an instruction unit configured to generate data center component instructions indicative of the power state information and registration status;
    a communication unit configured to communicate the instructions to the registered data center components;
    a receiver configured to receive the instructions at the registered data center components; and
    a power adjustment unit configured to deregister the data center component if the instruction includes a deregister status, else adjust power usage at the registered data center components based on the received instructions.

11. The system of claim 10, wherein the receiver is further configured to generate an acknowledgement responsive to receiving the instruction and to communicate the acknowledgement back to the control center.

12. The system of claim 11, wherein the communication unit is further configured to re-communicate the instructions if an acknowledgment is not received at the control center.

13. The system of claim 11, further comprising a scanner configured to scan the registered devices and to resend the instructions to one or more data center components having an acknowledge time generated before the most recent power usage adjustment.

14. The system of claim 10, wherein one or more data center components are remotely located from one or more other data center components.

15. The system of claim 10, wherein the control center is further configured to enable a user to manually enter the data center component's address information.

16. The system of claim 10, the registration unit is further configured to deregister a registered data center component responsive to receiving a message generated by the data center component.

17. The system of claim 10, the registration unit is further configured to deregister a registered data center component responsive to a command initiated by a user.

18. The system of claim 10, the registration unit is further configured to deregister a registered data center component if the component does not generate an acknowledgment.

19. A computer program product including non-transitory computer readable storage medium having stored thereon computer executable instructions that when executed by the processor of a computer perform steps comprising:

providing a control center to manage power state information for multiple data center components, wherein the power state information includes a metric indicating when power state information was last adjusted;

initiating, via the control center, component discovery, wherein component discovery includes identifying data center components capable of operating in a reduced power state;

registering, via the control center, data center components identified as capable of operating in a reduced power state;

acquiring, at the control center, a request to change a device operating condition for one or more data center components, wherein the request includes, for each of the one or more data center components, information associated with the power consumption of the data center component and a device registration status, the status including register or deregister;

generating data center component instructions indicative of the power state information and registration status;

communicating the instructions to the registered data center components;

receiving the instructions at the registered data center components; and deregistering the data center component if the instruction includes a deregister status, else adjusting power usage at the registered data center components based on the received instructions.

20. The computer program product of claim 19, wherein receiving the instructions at the registered data center components further includes generating an acknowledgement responsive to receiving the instructions and communicating the acknowledgement back to the control center.

* * * * *